United States Patent [19]

Idel et al.

[11] Patent Number: 4,645,825

[45] Date of Patent: Feb. 24, 1987

[54] FIBRES AND FILAMENTS OF POLYARYLENE SULPHIDES

[75] Inventors: Karsten Idel, Krefeld; Bernd Willenberg, Bergisch Gladbach, both of Fed. Rep. of Germany

[73] Assignee: Bayer Aktiengesellschaft, Leverkusen, Fed. Rep. of Germany

[21] Appl. No.: 761,364

[22] Filed: Aug. 1, 1985

[30] Foreign Application Priority Data

| Aug. 7, 1984 [DE] | Fed. Rep. of Germany | 3428984 |
| Aug. 7, 1984 [DE] | Fed. Rep. of Germany | 3428985 |
| Aug. 7, 1984 [DE] | Fed. Rep. of Germany | 3428986 |
| Jul. 20, 1985 [DE] | Fed. Rep. of Germany | 3526066 |

[51] Int. Cl.$^4$ .............................................. C08G 75/14

[52] U.S. Cl. .................................. 528/388; 264/210.7; 264/210.8; 264/176.1

[58] Field of Search ................. 528/388; 264/210.7, 264/210.8, 176 F

[56] References Cited

U.S. PATENT DOCUMENTS

| 3,912,695 | 10/1975 | Short et al. | 528/388 |
| 4,029,639 | 6/1977 | Gragson et al. | 528/373 |
| 4,098,776 | 7/1978 | Tieszen et al. | 528/373 |
| 4,115,562 | 9/1978 | Gragson et al. | 528/373 |
| 4,418,029 | 11/1983 | Reed et al. | 524/399 |

Primary Examiner—Melvyn I. Marquis
Attorney, Agent, or Firm—Connolly & Hutz

[57] ABSTRACT

The invention relates to fibres and filaments of special new polyarylene sulphides.

9 Claims, No Drawings

FIBRES AND FILAMENTS OF POLYARYLENE SULPHIDES

The invention relates to fibres and filaments of polyarylene sulphides.

The production of fibres and filaments from polyphenylene sulphides is known, for example from U.S. Pat. No. 3,895,091, U.S. Pat. No. 3,898,204, U.S. Pat. No. 3,912,695, U.S. Pat. No. 4,029,639 and U.S. Pat. No. 4,115,562, it is necessary, however, to subject the polyarylene sulphide at least partially to a curing procedure before it is processed.

It is for example known from U.S. Pat. No. 4,098,776 and U.S. Pat. No. 4,115,562 that the required properties of the fibres or of the fabrics produced therefrom can be achieved by thermal treatment of the fibres.

DE-A (German Auslegeschrift) No. 3,030,488 describes the production of fibres from crosslinked polyphenylene sulphide. U.S. Pat. No. 4,418,029, for example, describes processes for improving the procedure for melt-spinning polyarylene sulphides by means of stabilisers which reduce gel formation during the fibre production. A process for improving the procedure for melt-spinning polyarylene sulphides by means of multistage melt filtration is known from EP-A No. 102,536.

Furthermore, fibres of polyarylene sulphides are known in which the resin does not have to be subjected to a curing process before being spun, but the polyphenylene sulphide used has to be branched or crosslinked, optionally by using trifunctional comonomers, e.g. JP PS No. 57,143,518; 58,018,409; 58,031,112; 59,059,917 and 59,059,918.

EPA No. 056 418 describes the production of filament spun bonded sheets from a polyphenylene sulphide having a specific degree of branching.

It has now been found that fibres and filaments of polyarylene sulphide have a particularly favourable combination of properties if the weight average of the relative molecular weight $M_w$ (rel) and the melt viscosity $\eta_m$ fulfil particular conditions.

The invention therefore relates to fibres and filaments of polyarylene sulphide, characterised in that the weight average of the relative molecular weight $M_w$ is 25,000 to 500,000 and the melt viscosity $\eta_m$ in relation to the weight average of the relative molecular weight $M_w$ (rel) is as follows:

$$lg\ \eta_m = 3.48 \times lg\ M_w(rel) - 14.25 \pm 0.1,$$

preferably $$lg\ \eta_m = 3.48 \times lg\ M_w(rel) - 14.25 \pm 0.05.$$

According to the invention polyarylene sulphides which have been produced for example by DE/A Nos. 3,428,984, 3,428,985 or 3,428,986 can be processed into fibres and filaments.

Customary chromatographic methods can be used for determining the weight-averaged molecular weight $M_w$ of the polyarylene sulphides used, in order to obtain data concerning molecular weight and molecular-weight distribution.

High pressure liquid chromatography (HPLC) or gel permeation chromatography (GPC) are for example suitable for this purpose.

Customary supporting materials can be used as the stationary phase, for example, Li-Chropep ®, Lobar ®, LiChrosorb ®, LiChrospher ®, Perisorb ®, Hibar ®, Fractogel ®, Fractosil ®, Ultrastyragel ®, Microstyragel ®, Zorbax ®, Bondagel ® and Shodex ®.

Customary solvents can be used as the solvents and mobile solvents. They should dissolve the polymer to an adequate extent.

1-Chloronaphthalene, diphenyl, N-methylpyrrolidone, N-cyclohexylpyrrolidone, N-methylpiperidone, N-methylcaprolactam, N-methyllauryl lactam, sulpholane, N,N'-dimethylimidazolidinone, N,N'-dimethylpiperazinone, hexamethylphosphoric acid triamide, 1-methyl-1-oxa-phospholane and mixtures thereof are for example suitable.

Absolute or relative calibrations can be carried out in the chromatographic analytical methods. Customary polymers, such as, for example, polystyrene, polyethylene, polyethylene terephthalate, polybutylene terephthalate, polyesters, such as purely aromatic polyesters, polycarbonate, polamides, such as PA 6, PA 66, PA 11, polysulphones or polyether sulphones are for example suitable as calibration substances for relative calibrations.

The chromatography for the analytical determination of the molecular weights or molecular weight distribution can be carried out at various pressures of from 1 to 10 bars.

The chromatographic determination is carried out at a temperature of from room temperature to 250° C.

Furthermore substances such as alkali metal halides, alkaline earth metal carboxylates, or phosphonium or ammonium compounds can be added to improve the accuracy of the measurement of the sample to be analysed.

In evaluating the analytical data thus obtained the weight-averaged molecular weights $M_w$ can be determined. These are 25,000 to 500,000, especially 25,000 to 380,000, preferably 25,000 to 300,000 and particularly preferably 25,000 to 150,000.

The polyarylene sulphides have a melt viscosity $\eta_m$ of 20 to 500,000 Pa.s and a weight average of the relative molecular weight $M_w$ (rel) of 25,000 to 500,000, the melt viscosity $\eta_m$ and the weight average of the relative molecular weight $M_w$ being as follows:

$$lg\ \eta_m = 3.48 \times lg\ M_w(rel) - 14.25 \pm 0.1,$$

and preferably $\eta_m$ and $M_w$ are as follows:

$$lg\ \eta_m = 3.48 \times lg\ M_w(rel) - 14.25 \pm 0.05.$$

The methods of production described for example in DE-A Nos. 3,428,984, 3,428,986 and 3,428,985, in which water present in the reaction mixture is completely distilled out and the reaction is simultaneously controlled by the metered introduction of the reactants, proves to be advantageous for the production of the polyarylene sulphides used for fibre and filament production.

Thus the production can be carried out in various ways:

The alkali metal sulphides are preferably used in the form of their hydrates and aqueous solutions. The dehydration can be partial but is preferably total. The water present in the reaction mixture is distilled out of the mixture. The distillation of the water can be carried out directly or with the aid of azeotrope formers, it being possible to use the dihalogen aromatic compounds as azeotrope formers. For the purpose of dehydration all of the reactants can be mixed and the dehydration of the total mixture can be carried out. It is also possible for the alkali metal sulphide to be dehydrated separately together with some of the reaction components, or independently.

In one embodiment of the reaction the reactants are continuously combined together with the reaction accelerator or a mixture of reaction accelerators in the presence of the polar solvent with simultaneous removal of the water. In this method of procedure once a reaction has begun it can be controlled by the feed rates. Using this method long residence times of the water can also be avoided.

If total dehydration is carried out the reaction can be effected without any pressure or under a low pressure of up to about 3 bars. To obtain higher reaction temperatures above the boiling point of the solvent or of the mixture of solvent and di- and polyhalogen aromatic compounds a higher pressure of up to 50 bars can be used.

The reaction can be carried out continuously and discontinuously. The reaction time can be varied within a wide range. It can be 1-48 hours, preferably 1-18 hours. The reaction temperatures are between 150° and 300° C., preferably between 170° and 280° C.

The working up of the reaction mixture and the isolation of the polyarylene sulphides can be carried out in a known manner.

The polyarylene sulphide can be separated from the reaction solution by customary methods of procedure, for example by filtration or by centrifuging, either directly or after, for example, adding water and/or dilute acids or organic solvents with low solubility for polyarylene sulphides. After the polyarylene sulphide has been separated off it is then generally washed with water. Washing or extraction with other washing liquids, which can also be carried out in addition to or after the aforementioned washing step, is also possible.

The polyarylene sulphide can also be isolated for example by distilling off the solvent and subsequently washing the product, as described above.

The alkali metal sulphides can for example also be obtained from H₂S and the alkali metal hydroxides or from the hydrogen sulphides and alkali metal hydroxides.

Depending on the quantity of alkali metal hydrogen sulphide which is contained in the reaction solution as an impurity in the alkali metal sulphide specific quantities of alkali metal hydroxide can be additionally metered in. If appropriate, it is also possible to add, instead of the alkali metal hydroxides, compounds which split off or form alkali metal hydroxides under the reaction conditions.

The polyphenylene sulphides were produced from a. 50-100 mol % of dihalogen aromatic compounds of the formula

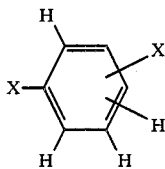

(I)

and 0-50 mol % of dihalogen aromatic compounds of the formula

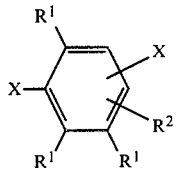

(II)

in which
X represents halogen, such as chlorine or bromine, which is in the meta or para position to the other halogen and
R¹ and R² are identical or different and can be hydrogen $C_1$-$C_4$-alkyl, $C_5$-$C_{10}$-cycloalkyl, $C_6$-$C_{10}$-aryl, $C_7$-$C_{10}$-alkylaryl or $C_7$-$C_{14}$-arylalkyl,
and b. alkali metal sulphides, preferably sodium or potassium sulphide or mixtures thereof, preferably in the form of their hydrates or aqueous mixtures, optionally together with small amounts of alkali metal hydroxides such as sodium and potassium hydroxide, and 0-50 mol % of alkali metal bisulphide, preferably sodium and potassium hydrogen sulphide, or mixtures thereof, it being possible for the molar ratio of a:b to be in the range of 0.75:1 to 1.25:1 and optionally in the presence of the abovementioned reaction accelerators.

In order to obtain thermoplastically processible polyphenylene sulphides p-dihalogen aromatic compounds are preferably used.

Examples of dihalogen aromatic compounds of the formula (I) to be used according to the invention are: p-dichlorobenzene, p-dibromobenzene, 1-chloro-4-bromobenzene, 1,3-dichlorobenzene, 1,3-dibromobenzene and 1-chloro-3-bromobenzene. They can be used independently or as mixtures with one another. 1,4-Dichlorobenzene and/or 1,4-dibromobenzene are preferred.

Examples of dihalogen aromatic compounds of the formula (II) to be used according to the invention are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,4-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. They can be used independently or as mixtures with one another.

In general any polar solvent which ensures adequate solubility of the organic and, if appropriate, inorganic reactants under the reaction conditions can be used for the reaction. N-alkyl lactams are preferably used.

N-alkyllactams are those of amino acids with 3-11 C-atoms, which can optionally carry substituents on the carbon skeleton which are inert under the reaction conditions.

The following are for example used as the N-alkyl lactams:
N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Mixtures of the abovementioned solvents can be used.

The melt viscosity is 25–500,000, preferably 50–5,000 Pa.s, more preferably 100–3,000 Pa.s, at 306° C. and a shear stress of $10^2$ Pa: the viscosity is measured with an Instron rheometer 3250 which is fitted with a cone-plate system with a diameter of 20 mm.

The polyarylene sulphide according to the invention is spun by customary melt-spinning methods and in general does not demand any special requirements. The processing temperature is 5°–100° C. above the melting point of the polymer, preferably 10°–50° C. above the melting point of the polymer.

Then the spun product is drawn in the solid state. This drawing is carried out at room temperature, preferably at elevated temperatures, but always at temperatures below the melting point of the polymer, particularly preferably within a temperature range between 70° C. and 150° C. The total degree of drawing is preferably from 4–10. The drawing can for example be carried out in air, water or other heat carriers or on contact heaters.

The drawing can be carried out in one or more than one stage.

Preferably it is possible to follow the drawing process with a heat setting process, for example to improve the thermal properties, especially for reducing shrinkage in boiling water and under the influence of heat.

The heat setting can be carried out continuously or discontinuously, preferably continuously.

The heat setting can be carried out under tension or without tension, preferably under tension and at temperatures which lie below the melting point of the polyarylene sulphide, preferably at up to 100° C., particularly preferably at up to 50° C., below the melting point. The residence times for the heat setting are from 1 second to 10 minutes, preferably from 10 seconds to 200 seconds.

In this fixation process fibres with a high degree of crystallinity can be produced. The fibres according to the invention are distinguished by the unproblematical manner in which they can be produced, the polyphenylene sulphide to be spun does not have to undergo a curing process. The use of trifunctional branching agents is also generally not necessary in the case of the polyarylene sulphides used according to the invention for the production of fibres. No stabilisers are required for preventing after-curing during spinning which can lead to the formation of gel particles. Also, special filtration processes are not necessary; in order to prevent breaks in filament yarn during spinning and drawing customary nozzle filters with a hole diameter of between 40–20 μm are adequate.

A further advantage of the process according to the invention is that no gas emissions are observed during the processing of the polymer and the spun material is free of voids.

The spinning is carried out by customary melt-spinning techniques and does not demand any special precautionary measures, and in particular all customary yarn-guiding elements can be used.

The frequency of breaks in the yarn during spinning and drawing is not increased compared with customary textile fibres.

The spun material obtained is not brittle, can be drawn without any problems and crystallises in the course of a brief heat setting procedure which can be carried out continuously.

The fibres and filaments according to the invention can be subjected to customary textile processing procedures without any problems.

As a result of their high crystallinity the fibres and filaments according to the invention are distinguished by high thermostability, low boiling water and heat shrinkage and a very low tendency to creep at high temperatures. Furthermore the fibres and filaments according to the invention are characterised by high strength, a high modulus and high resistance to chemicals.

The fibres and filaments according to the invention are suitable for example for the production of protective clothing and non-woven materials, for example for filtration and for electrolytic membranes.

EXAMPLE 1

1.110 g of N-methylcaprolactam, 323.5 g of sodium sulphide hydrate (=2.45 mols of Na$_2$S), 2.4 g of 50% strength sodium hydroxide solution 341.1 g of 1,4-dichlorobenzene (=2.32 mols), 28.53 g of sodium acetate and 5.07 g of ε-aminocaproic acid (0.035 mol) are initially introduced, under nitrogen, into a 2 l three-necked flask equipped with a thermometer, a stirrer and a column with a distillate-separator. The reaction mixture is heated slowly to the boil. Water is separated from the distilled azeotrope, consisting of water and p-dichlorobenzene, and p-dichlorobenzene is recycled into the reaction vessel. After 2 hours no more water can be detected either in the distillate or in the bottom product. The mixture is heated for a further 9 hours under reflux and the product is isolated in the form of a white fibre in the customary manner by precipitation in water, acidification, washing free of electrolytes with the aid of water, and drying. The characterisation is carried out by determining the melt viscosity:

$\eta_m = 360$ Pa.s (measured at $10^2$ Pa and 306° C.) and the weight average of the relative molecular weight $M_w = 68,000$.

EXAMPLE 2

The apparatus was as in Example 1.1,110 g of N-methylcaprolactam, 323.5 g of sodium sulphide hydrate (=2.45 mols), 28.0 g of 50% strength sodium hydroxide solution, 341.1 g of 1,4-dichlorobenzene (=2.32 mols), 30.2 g of N,N-dimethylacetamide (15 mol %) and 5.07 g (0.035 mol) of ε-aminocaproic acid. The reaction mixture is heated slowly to the boil. From the distilled azeotrope, consisting of water and p-dichlorobenzene, water is separated off and p-dichlorobenzene is recycled. After 2 hours no more water can be detected either in the distillate or in the bottom product. The mixture is heated for a further 9 hours under reflux and the product is processed further in the same way as in Example 1.

$\eta m = 300$ Pa.s (measured at $10^2$ Pa and 306° C.), weight average of the relative molecular weight: $M_w = 64,000$.

EXAMPLE 3

As in Example 1, except that 76.1 g (0.58 mol) of ε-aminocaproic acid and 344,6 g (2.61 mols) of sodium sulphide hydrate are used and combined with solutions of N-methylcaprolactam and p-dichlorobenzene and sodium sulphide hydrate and ε-aminocaproic acid with simultaneous dehydration. The mixture is reacted further and worked up as in Example 1.

ηm=1,900 Pa.s (measured at $10^2$ Pa and 306° C.).

Weight average of the relative molecular weight: $M_w$=109,000.

EXAMPLE 4

A polymer produced according to Example 2 and having a melt viscosity of 300 Pa.s at 306° C. is extruded through a single-hole nozzle with a diameter of 0.5 mm using a melt-spinning extruder. The monofilament was cooled in a water bath and the windup speed was 200 m/min. The drawing was carried out in two stages on contact heaters at 95° C. to give a total degree of drawing of 5.3. The monofilament thus obtained displayed the following textile data:
 titre: 23 dtex
 tenacity: 3.2 cN/dtex
 elongation at break: 13%
 initial modulus: 39 cN/dtex
 boiling water shringkage: 13%

The wide-angle X-ray scattering of this fibre showed high orientation but low crystallinity.

The monofilament was fixed under tension at 260° on a heated godet with a residence time of two minutes. The following textile data were obtained:
 titre: 24 dtex
 tenacity: 3.3 cN/dtex
 elongation at break: 17%
 initial modulus: 44 cN/dtex
 boiling water shrinkage: <0,2%
 hot-air shrinkage 240° C.: <0,2%

A creep test in which 10 cm of the monofilament were heated from room temperature to 240° C. under a load of 0.1 cN/dtex and kept at 240° C. for one hour, showed elongation of 1.2% after one hour.

The wide-angle X-ray scattering of this fibre showed a highly orientated crystalline structure.

After tensionless heat treatment of the monofilament for 24 h at 240° C. in air the following textile data were obtained:
 tenacity: 3.1 cN/dtx
 elongation at break: 19%
 initial modulus: 43 cN/dtex The textile data remain virtually the same after the heat treatment.

EXAMPLE 5

A polyphenylene sulphide produced according to Example 3 and having a melt viscosity of 1900 Pa.s at 306° C. was spun at 330° C. through a single-hole nozzle with a hole diameter of 0.5 mm using a melt-spinning extruder, was cooled in water and wound up at 200 m/min. The monofilament was drawn in three stages on contact heaters at 95° C. and 120° C. to a total degree of drawing of 5.4 and was then thermofixed under tension at 275° C. and with a residence time of two minutes. The following textile data were obtained:
 titre: 20 dtex
 tenacity: 3.8 cN/dtex
 elongation at break: 16%
 initial modulus: 52 cN/dtex
 boiling water shrinkage: <0,2%
 hot-air shrinkage 240° C.: <0,2%

The creep test for 1 h at 240° C. under a load of 0.1 cN/dtex showed elongation of 0.5%.

EXAMPLE 6

A polyphenylene sulphide produced according to Example 1 and having a melt viscosity of 360 Pa.s at 306° C. was spun at 295° C. through a nozzle with thirty holes of a diameter of 0.25 mm and a channel length of 0.5 mm.

The nozzle filter consisted of a VA-fabric with 16000 mesh/cm².

The windup speed was 500 m/min. The spun material was drawn in three stages (twice in boiling water, then on contact heaters at 135° C.) to a total degree of drawing of 7.1 and then fixed at 260° C. under tension with a residence time of one minute.

The following textile data were obtained:
 titre: 2.4 dtex
 tenacity: 4.1 cN/dtex
 elongation at break: 11%
 initial modulus: 55 cN/dtex
 boiling water shrinkage: <0.2%
 heat shrinkage 240°: <0,2%

The creep test after 1 h at 240° C. and under a load of 0.1 cN/dtex showed elongation of 1%.

EXAMPLE 7

A polyphenylene sulphide produced according to Example 1 and having a melt viscosity of 360 Pa.s at 306° C. was spun at 300° C. through a nozzle with thirty holes of a diameter of 0.25 mm and a channel length of 0.5 mm.

The nozzle filter consisted of a VA fabric with 25,000 mesh/cm². The windup speed was 1800 m/min. The spun material was drawn in three stages (twice in boiling water, once at 135° C. on contact heaters), to a total degree of drawing of 7.5 and was then fixed under tension at 260° C. with a residence time of one minute.

The following textile data were obtained:
 titre: 1.4 dtex
 tenacity: 4.4 cN/dtex
 elongation at break: 10%
 initial modulus: 58 cN/dtex
 shrinkage at the boil: <0,2
 heat shrinkage 240° C.: <0,2

The creep test after 1 hour at 240° C. under a load of 0.1 cN/dtex showed elongation of 1%.

We claim:

1. A fibre or filament of a polyarylene sulphide, characterised in that the polyarylene sulphide has a melt viscosity, $\eta_m$, of 20 to 500,000 Pa.s and a weight average of the relative molecular weight $M_w$ (rel) of 25,000 to 500,000 wherein:

$$lg\ \eta_m = 3.48 \times lg\ M_w(rel) - 14.25 \pm 0.1.$$

2. A fibre or filament according to claim 1, wherein:

$$lg\ \eta_m = 3.48 \times lg\ M_w(rel) - 14.25 \pm 0.05.$$

3. A fibre or filament according to claim 1, characterised in that the polyarylene sulphide is produced in an N-alkyl lactam.

4. A fibre or filament according to claim 1, characterised in that the polyarylene sulphide is produced in N-methylcaprolactam.

5. A fibre or filament according to claim 1, characterised in that p-dichlorobenzene, p-dibromobenzene or 4,4′-dichlorodiphenylsulphone is used for production of the polyarylene sulphide.

6. A fibre or filament according to claim 1, characterised in that water is completely removed from reactants used to prepare the fibres or filaments or in that the reactants are anhydrous.

7. A fibre or filament according to claim 1, characterised in that production is controlled by metered introduction of reactants used to produce the fibres or filaments.

8. A fibre or filament according to claim 1, characterised in that the fibres or filaments are first drawn and then are subjected to a heat setting process.

9. A fibre or filament according to claim 1, characterised in that the total fibre or filament elongation under a creep test under a load of 0.1 cN/dtex at 240° C. is not more than 2% after 1 h.

* * * * *